Jan. 3, 1956 D. C. BROUGHTON ET AL 2,729,268
METHOD AND APPARATUS FOR ERECTING A FIBER
REINFORCED PLASTIC STORAGE STRUCTURE
Filed Dec. 20, 1954 4 Sheets-Sheet 1
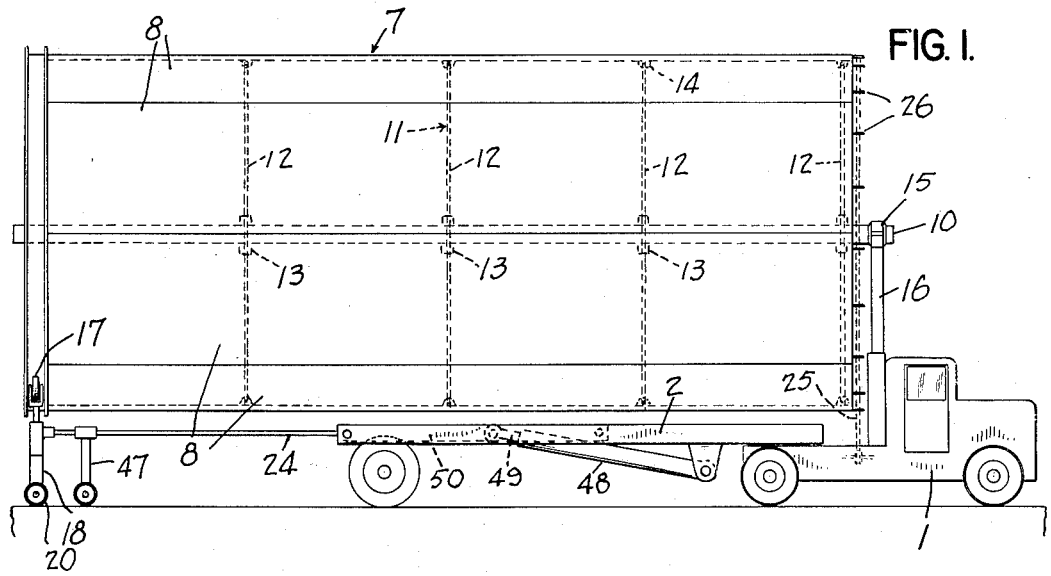
FIG. I.
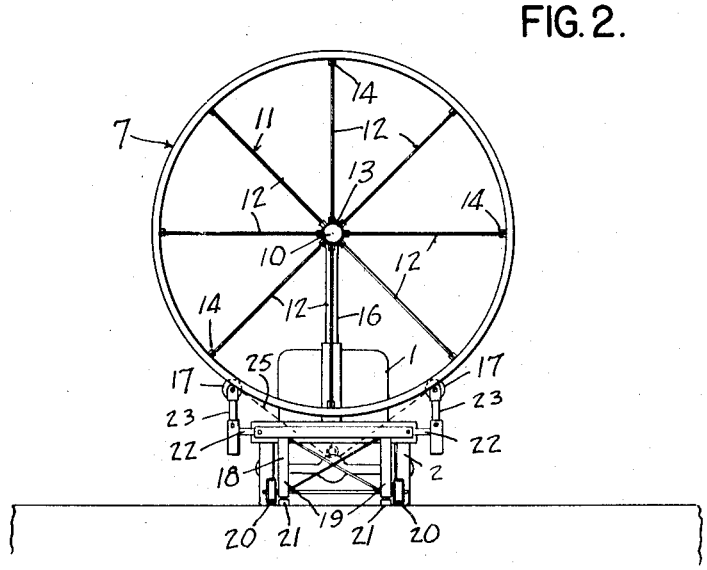
FIG. 2.
INVENTORS
DEAN C. BROUGHTON
ERWIN G. DUERINGER
BY
Attorneys Jan. 3, 1956

D. C. BROUGHTON ET AL 2,729,268

METHOD AND APPARATUS FOR ERECTING A FIBER
REINFORCED PLASTIC STORAGE STRUCTURE

Filed Dec. 20, 1954

INVENTORS
DEAN C. BROUGHTON
ERWIN G. DUERINGER

BY Andrus & Scales

Attorneys

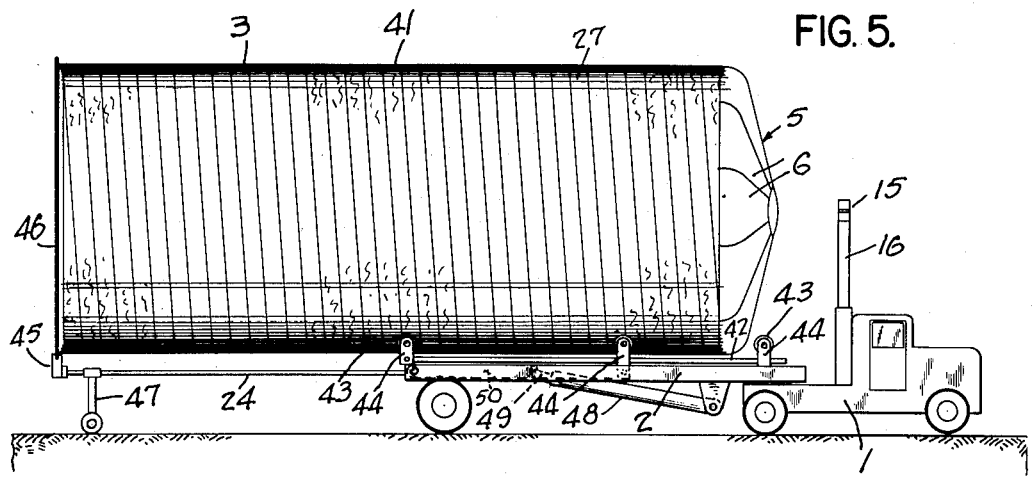
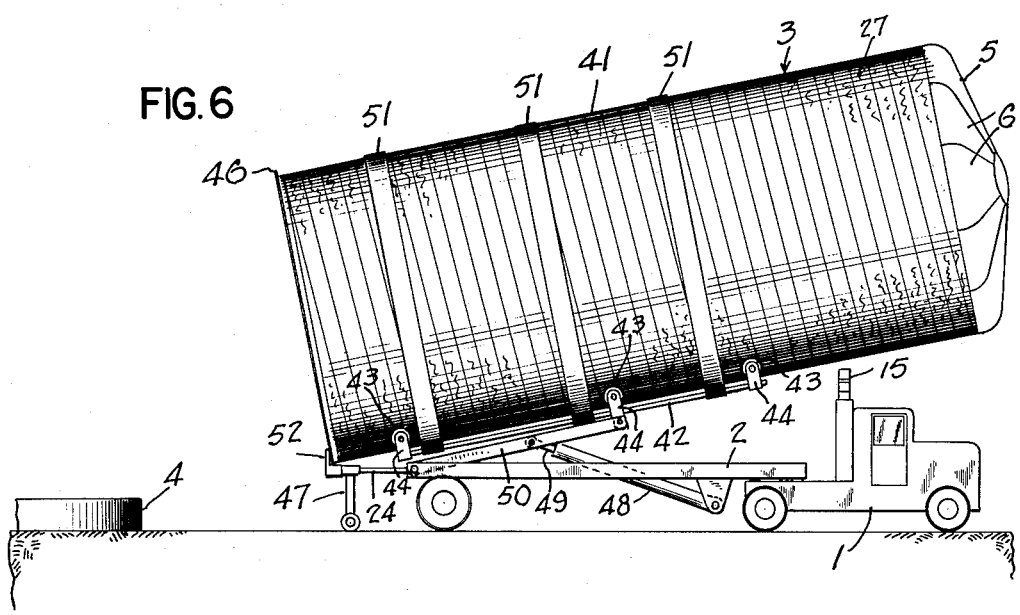

Jan. 3, 1956 D. C. BROUGHTON ET AL 2,729,268
METHOD AND APPARATUS FOR ERECTING A FIBER
REINFORCED PLASTIC STORAGE STRUCTURE
Filed Dec. 20, 1954 4 Sheets-Sheet 4

INVENTORS
DEAN C. BROUGHTON
ERWIN G. DUERINGER
BY
*Andrus & Scales*
Attorneys ly. While, if the structure is transported in a number of sections the transportation problem is simplified but the cost of handling and assembly at the site is increased.
United States Patent Office 2,729,268
Patented Jan. 3, 1956

2,729,268

METHOD AND APPARATUS FOR ERECTING A FIBER REINFORCED PLASTIC STORAGE STRUCTURE

Dean C. Broughton and Erwin G. Dueringer, Milwaukee, Wis., assignors to A. O. Smith Corporation, Milwaukee, Wis., a corporation of New York Application December 20, 1954, Serial No. 476,307

6 Claims. (Cl. 154—1.8)

This invention relates to a method of fabricating and erecting a storage structure and more particularly to a structure formed of fiber reinforced plastic.

In the past, difficulties have been encountered in fabricating and erecting large storage structures, such as silos or oil tanks, because of the problems involved in handling and shipping these large structures. Ordinarily the storage structure is assembled in the factory and transported to the site either as the completed structure or in a number of sections. If the storage structure is transported as a completed vessel, the equipment involved in shipping and transporting such a large structure is considerable. While, if the structure is transported in a number of sections the transportation problem is simplified but the cost of handling and assembly at the site is increased.

The present invention is directed to a method of fabricating a fiber reinforced plastic vessel at the site and erecting the same on a preformed foundation.

According to the invention a cylindrical sectionalized mandrel and the materials of fabrication for the vessel are shipped to the site on a truck or other vehicle. The mandrel is assembled in cylindrical shape on the trailer of the truck and the fiber reinforcement, impregnated with a suitable resin, is wound on the mandrel to form a generally cylindrical shell of the vessel. After the resin has cured, the mandrel is disassembled and removed from the shell. The roof, if required, is then attached to the shell while the same is supported on the trailer.

The shell is then pivoted upwardly from the trailer while being held at its lower end and tilted into position on the foundation.

The present invention provides an inexpensive method of fabricating and erecting a storage vessel. The vessel can be fabricated very rapidly and because of the mobile nature of the equipment, and the vessel can be erected at any desired site regardless of its position with respect to the commercial transportation routes.

The entire fabricating and erecting equipment can be carried on a single vehicle and this substantially reduces the transportation costs involved in the erecting of a vessel of substantial size. In addition, there is a minimum of handling involved so that the cost of this factor is also minimized.

The drawings furnished herewith illustrate the best mode of carrying out the invention as presently contemplated and set forth hereinafter.

In the drawings:

Figure 1 is a side elevation of the mandrel as assembled on the trailer;

Fig. 2 is an end view of the apparatus shown in Figure 1;

Fig. 5 is a side elevation of the completed shell, with the mandrel withdrawn, and with the roof attached;

Fig. 6 is a side elevation of the shell being tilted upwardly from the trailer;

Figure 3:
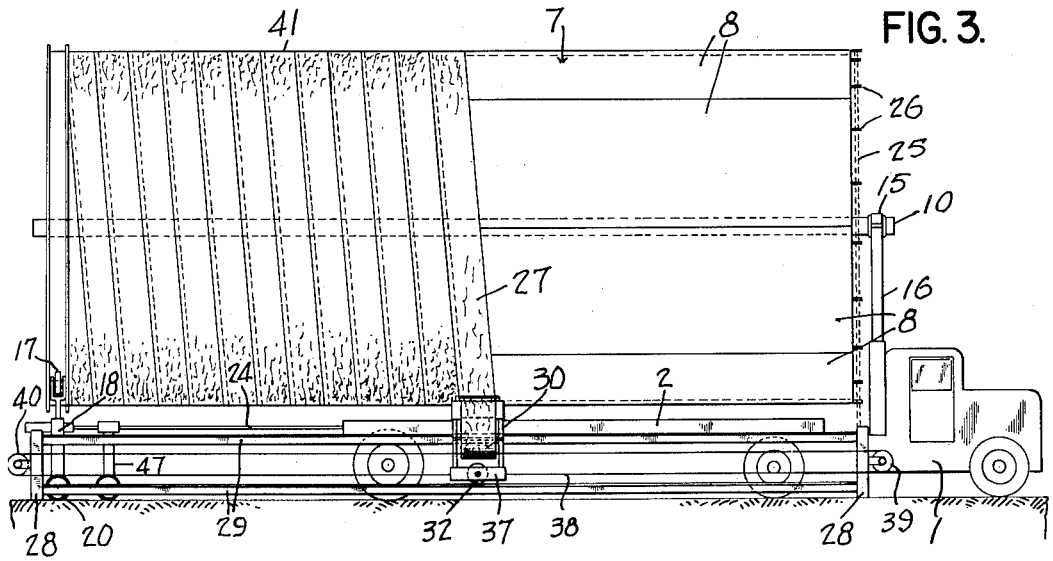
Fig. 3 is a view similar to Figure 1 showing the mandrel being wound with a fibrous material.
Figure 4:
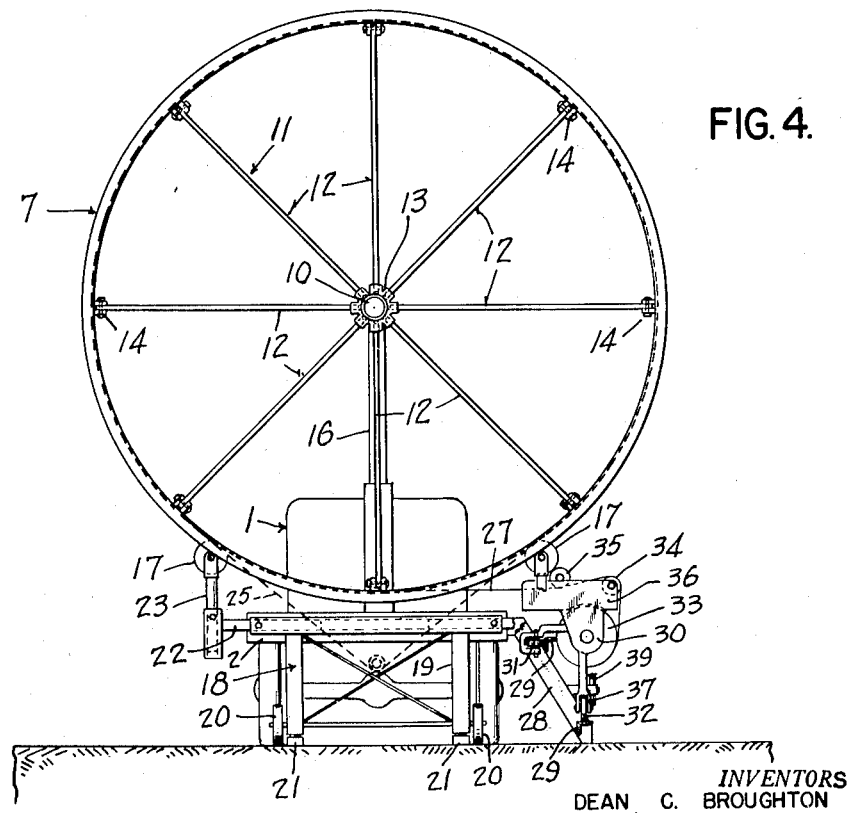
Fig. 4 is an end view of the apparatus shown in Fig. 3.
Figure 7:
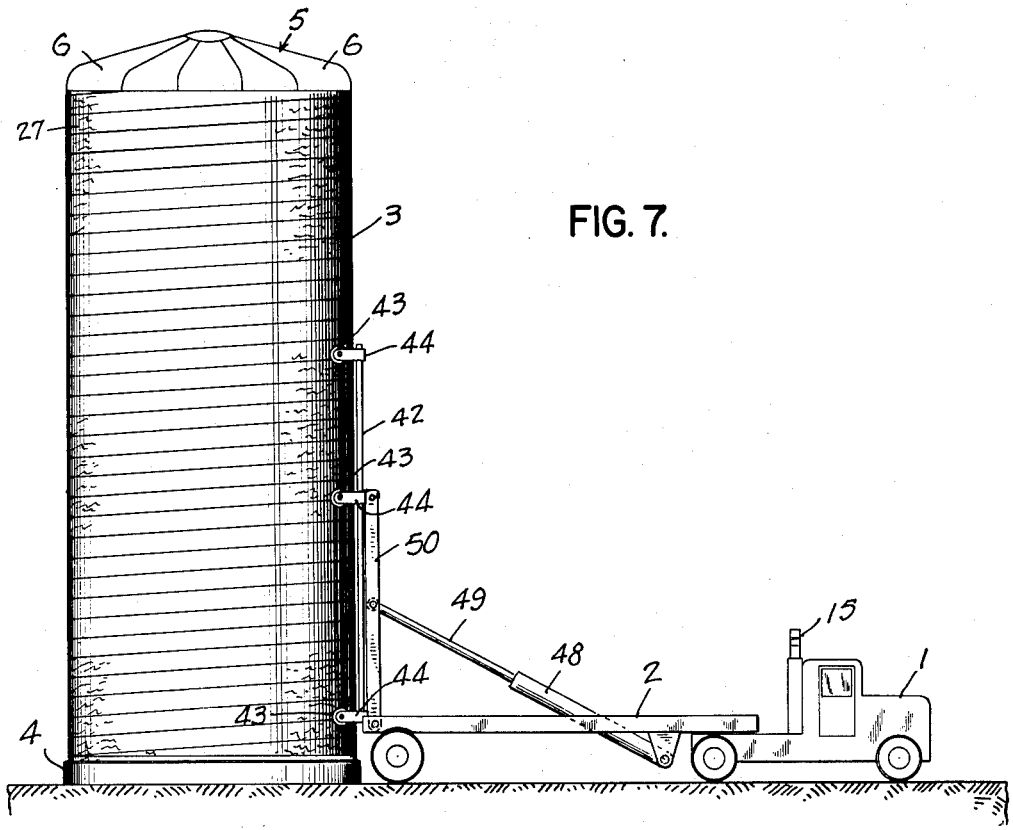
Fig. 7 is a side elevation of the shell being placed in position on the foundation.

Referring to the drawings, there is shown a tractor 1 and an attached trailer 2 which is adapted to transport the equipment and materials of fabrication for a substantially large diameter storage vessel to the site at which the storage vessel is to be erected. The storage vessel to be fabricated and erected, as best shown in Fig. 7, consists of a generally cylindrical shell 3 which is wound from resin-impregnated, reinforcing fibers and is supported on a suitable foundation 4. The shell may be enclosed at the top by a roof 5 which is formed of a plurality of pie-shaped panels 6.

As shown in Figure 1, the cylindrical shell 3 of the vessel is wound on a generally cylindrical mandrel 7 which is assembled on trailer 2. The mandrel 7 is formed of a series of generally arcuate panels or segments 8 which are joined together at their adjacent flanged edges to form the cylindrical mandrel. Each of the segments 8 is provided with an inwardly extending peripheral flange 9 which is adapted to be disposed in contiguous relation with the corresponding flange 9 of the adjacent segments. The matching flanges 9 of the segments 8 are secured together by bolts or the like.

To reinforce and internally support the mandrel 7, the mandrel is connected to an axial shaft 10 by a series of spider supports 11 which are spaced longitudinally within the mandrel. The supports 11 are formed of a plurality of circularly spaced braces 12 with the inner ends of the braces being pivotally attached to a collar 13 on shaft 10. This pivotal connection enables the braces to be pivoted to lie generally parallel to the shaft for shipment. The shaft itself is formed in a number of sections so that it can be broken down into smaller sections for shipping.

The outer ends of the braces 12 are removably secured to lugs 14 which are attached to the mandrel at spaced intervals along the inner periphery thereof. The braces 12 serve to support the mandrel during the winding operation.

The inner end of the mandrel, the end adjacent the tractor 1 is mounted for rotation by journaling the corresponding end of the shaft 10 in a bearing 15 carried by bearing support 16. Bearing support 16 is secured to the tractor adjacent the cab and is adjustable in height to accommodate mandrels of various diameters.

The outer end of the mandrel 7 is supported for rotation by a pair of rollers 17 which are carried by a movable dolly 18. Dolly 18 consists of a generally rectangular frame 19 mounted on wheels 20 which are adapted to ride on the ground. The frame can be leveled on rough terrain by means of the adjustable levels 21 which are connected to the frame adjacent the wheels.

A pair of generally horizontal arms 22 are slidably connected to the frame, and a generally vertical extension 23 is slidably secured to the end of each of the arms 22. The supporting rollers 17 are carried on the upper ends of the vertical extensions 23. By this structure the arms 22 are adjustable horizontally and the extensions 23 are adjustable vertically so that mandrels of various diameters can be rotatably supported on the rollers 17. In addition to this adjustment, the dolly 18 is connected to the ends of a pair of rods 24 which are slidably secured within the frame of the trailer 2. By extending the rods 24 with respect to the trailer 2 the position of the dolly 18 can be varied to accommodate mandrels of different lengths.

The levels 21 also provide an adjustment whereby the mandrel can be maintained substantially level regardless of the roughness of the terrain at which the trailer is located.

The mandrel is rotated about its central axis by a drive shaft take-off which consists of a chain 25 connected to the drive shaft of the tractor 1 and engageable with a series of pins 26 disposed on the end surface of the mandrel. The drive shaft of the tractor drives the chain 25 which in turn rotates the mandrel 7.

The reinforcing fibers, in the form of strands or strips 27, are wound on the mandrel 7 by a winding head assembly. The winding head assembly consists of a frame formed of a pair of end braces 28 which are secured to the dolly 18 and to the tractor 1, respectively. The lower ends of the end braces 28 rest on the ground and the braces are connected together by a pair of horizontal angle rails 29.

The winding head which lays the reinforcing material 27 on the mandrel consists of a frame 30 to which rollers 31 and 32 are rotatably attached. Roller 31 is disposed in a generally horizontal plane and is adapted to ride on the upper of the pair of rails 29. The roller 32 is disposed generally vertically and is adapted to ride on the lower of the rails 29. As the winding head frame 30 is moved reciprocally with respect to the mandrel 7, the rollers 31 and 32 ride on the rails 29 and the frame is maintained in alignment with respect to the mandrel by the engagement of the rollers with the rails.

The fibrous reinforcing material 27 is contained on a reel 33 which is rotatably attached to frame 30. The reinforcing material 27 consists of reinforced fibers of glass, asbestos, animal or synthetic materials and may be in the form of roving, fabric, matting or the like.

The reinforcing material 27 is impregnated with a liquid, uncured resin by any conventional means. The resin may be any of the common thermosetting resins or a thermoplastic resin having a heat distortion temperature above the temperatures which the storage structure will ordinarily encounter in service. As shown in the drawings, the reinforcing material from reel 33 passes over a series of rollers 34 and 35 and travels through a bath of liquid resin contained in trough 36 which is secured to the winding head frame 30. The rollers 34 and 35 are rotatably attached to the trough. Alternately, the reinforcing material may be impregnated with a resin by dipping or spraying the resin on the wound roving, moving the mandrel through a bath of resin, or by any other desired means.

The winding head frame 30 is driven reciprocally with respect to the mandrel 7 by connecting the bracket 37, which supports roller 32, to chain 38. Chain 38 travels around a pair of sprockets 39 and 40 which are rotatably secured to the respective end braces 28. Sprocket 39 is driven by a suitable power take-off from the drive shaft of the tractor 1 and is provided with reverse power so that the winding head frame 30 may move reciprocally.

The reinforcing material 27 is wound on the mandrel 7 in a generally helical pattern to form a cylindrical shell 41 of the vessel.

The shell 41 consists of a series of layers of windings with each layer having a reversed helix angle with respect to the adjacent layers. The number of layers and the number of helix angles to be employed for the vessel depend on the ultimate use and strength requirements for that particular use. The resin matrix is cured to form a resin-bonded fiber reinforced shell 41. The curing may be accelerated by the application of heat to the shell but the curing time will depend on the particular resin employed for the fabrication of the vessel.

To permit the cured shell 41 to be moved longitudinally with respect to the trailer 2, a conveying frame 42 which supports a series of rollers 43 is lifted from the trailer bed into contact with the shell 41. The rollers 43 which are rotatably secured to brackets 44 on frame 42 serve to support the shell and permit longitudinal movement of the same.

After the shell 41 has been cured and the rollers 43 elevated to support the shell, the mandrel 7 and spider supports are disassembled and removed from within the shell.

Figure 8:
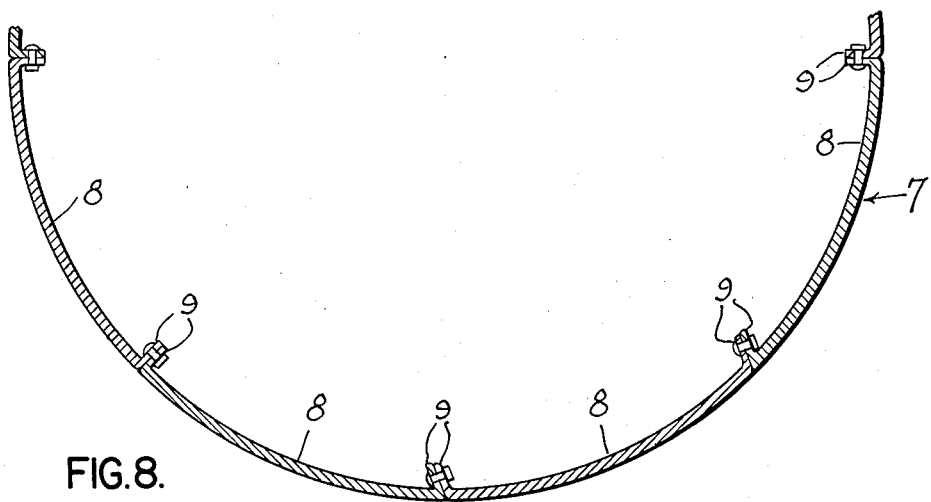
Fig. 8 is a transverse section of a portion of the mandrel showing its segments and the method of attaching them together.

To permit the mandrel segments 8 to be readily disassembled, one of the segments 8 is provided with inwardly diverging flanges, as shown in Fig. 8. The matching flanges 9 of the adjacent segments 8 are provided with complementary contours. With this construction the segments having the inwardly diverging flanges can be readily removed and the remaining segments can then be disassembled. The shell 41 is moved on the rollers 43 by a clamp 45, see Fig. 5, which is substituted for the dolly 18 and is secured to the ends of the extension rods 24. The clamp 45 is adapted to engage an angle bar 46 which is wound into the shell at the outer edge portion thereof.

The rods 24 and the outer end of the shell are supported by a dolly 47 which is secured to the rods 24 inwardly of the ends thereof. By extending or contracting the rods 24 from the trailer 2, the shell 41 can be moved outwardly or inwardly over the rollers 43. The dolly 47 is adapted to ride on the ground as the shell is moved with respect to the trailer 2.

To position the wound shell 41 on the foundation 4, the shell is tilted upwardly from the trailer 2 by a pair of hydraulic cylinders 48. The ram 49 of each cylinder is pivotally connected to the mid-portion of a link 50. The lower end of each link 50 is pivotally attached to the trailer 2 while the upper end of each link is pivotally attached to the side rails of frame 42. By extending the ram 49 the shell 41 is tilted upwardly so that the shell can be pivoted into position on the foundation 4. As the shell is pivoted upwardly, rods 24 are drawn inwardly to move the shell longitudinally on the rollers 43 to position the outer end of the shell adjacent the outer end of the trailer 2. The links 50 permit the frame 42 to pivot in accordance with inward movement of the shell so that the weight of the shell will be carried by all of the rollers 43 as the shell is tilted upwardly.

With the outer end of the shell disposed adjacent the outer end of the trailer, the shell is secured to the conveyor frame 42 by a plurality of metal bands 51 which encompass the shell and are attached to the frame 42. The bands 51 prevent the shell from moving on rollers 43 as the shell is tilted further upwardly to a vertical position.

In fabricating and erecting a storage vessel such as that described, the equipment and materials for fabrication are hauled to the site on trailer 2. After removal of the equipment the dollies 18 and 47 are attached to extension rods 24. The mandrel 7 is then initially assembled on the trailer by disposing the inner end of the shaft 10 in the bearing 15 carried by bearing support 16. Two longitudinal sections of the panels 9 are then placed on the rollers 17 and attached together through the flanges 9. The assembled mandrel sections are then connected to the shaft by the attachment of the braces 12.

With two sections of the mandrel assembled a third section is secured thereto and the mandrel is then rotated manually to dispose the second and third sections on the rollers 17. A fourth section is then attached to the third mandrel section and the mandrel is again rotated. This procedure is repeated until the entire mandrel is assembled.

After assembly of the mandrel, the winding head assembly is secured in position to the trailer and dolly 18.

The mandrel is then rotated and the winding head frame 30 is moved reciprocally to wind the reinforcing material 27 in a helical pattern on the mandrel.

After the completion of winding and curing of the resin, the shaft 10, braces 12 and mandrel 7 are then disassembled and removed from within the shell 41. The conveyor frame is then moved upwardly through a suitable hydraulic lift so that support rollers 43 are in contact with the completed shell 41. The winding head assembly is then removed and the dolly 18 is withdrawn from the rods 24.

The clamp 45 is engaged on the outer ends of the rods 24 and is connected to the ring 46 which is wound in the outer end of the shell. The rods 24 are then extended from trailer 2 to move the shell 41 outwardly on rollers 43. The shell 41 is then in position for attachment of the roof 5. The roof is attached to the shell by securing the pie-shaped panels 6 to the inner edge portion of the shell by bolts or the like.

The completed shell is then in condition for erection onto the foundation 4. The clamps 45 are then removed from the rods 24 and a pusher bar 52 is substituted for the clamps.

The hydraulic rams 49 are then extended causing the frame 42 and shell 41 to be tilted upwardly. As the shell is tilted upwardly, the pusher bar 52 is moved inwardly toward the tractor 1 causing the shell to be moved inwardly on rollers 43 as the shell is tilted.

When the shell has been tilted to a degree approximating that shown in Fig. 6, the outer end or the base portion of the shell has been moved inwardly to a position adjacent the trailer 2. With the shell in this position the metal bands 51 are secured about the shell to attach the shell to the conveyor frame 42. At this time the pusher bar 52 and the dolly 47 are removed and the rods 24 are drawn inwardly within the trailer 2.

The vehicle is then moved so that the outer end of the trailer is substantially over the periphery of the foundation 4. With the trailer in this position the rams 49 are extended further causing the shell to be tilted upwardly to a generally vertical position. With the shell disposed vertically, the lower end of the shell is spaced upwardly from the foundation 4. The bands 51 are then removed and the shell lowered onto the foundation by use of jacks or the like. The base ring 46 is then suitably secured to the foundation by bolts to complete the erection of the vessel on the foundation.

The present invention provides a rapid method of fabricating and erecting a large storage vessel. As the fabricating and erecting equipment can all be carried on a single vehicle the transportation costs and costs of handling are substantially reduced. By using mandrels of different diameters and lengths, storage structures of various sizes can be conveniently fabricated.

As the vessel is to be erected at the site of its use and is erected on a mobile unit, the vessels can be erected in numerous locations which are not accessible to the conventional transportation routes.

Various modes of carrying out the invention are contemplated as being within the scope of the following claims particularly pointing out and distinctly claiming the subject matter which is regarded as the invention.

We claim:

1. An apparatus for fabricating and erecting a storage vessel which comprises a movable platform, a sectionalized generally cylindrical mandrel mounted for rotation about the longitudinal axis thereof on said platform with the outer end of said mandrel extending outwardly beyond said platform, means for rotating said mandrel about said axis, means for winding a fibrous reinforcing strand on the rotating mandrel in a generally helical pattern and for coating the strand with a resinous material to form a cylindrical shell, a telescopic member connected to the platform and adapted to be extended outwardly from the platform beneath the outer end of the mandrel, supporting means associated with said telescopic member for rotatably supporting the outer end of the mandrel during rotation thereof, means connected to the platform for engaging the shell and tilting the same upwardly about the outer end thereof to a substantially vertical position with said telescopic member adapted to be drawn inwardly toward the platform as the shell is tilted, and clamping means connected to the telescopic member for engaging the outer end of the shell and for moving the shell longitudinally as the shell is tilted upwardly, the outer end of the shell being moved inwardly to a position adjacent the platform to permit the shell to be subsequently positioned on a foundation.

2. An apparatus for fabricating and erecting a storage vessel which comprises a movable platform, a sectionalized generally cylindrical mandrel mounted for rotation about the longitudinal axis thereof on said platform with the outer end of said mandrel extending outwardly beyond said platform, means for rotating said mandrel about said axis, means for winding a fibrous reinforcing strand on the rotating mandrel in a generally helical pattern and for coating the strand with a resinous material to form a cylindrical shell, a telescopic member connected to the platform and adapted to be extended outwardly from the platform beneath the outer end of the mandrel, supporting means associated with said telescopic member for rotatably supporting the outer end of the mandrel during rotation thereof, roller means associated with the platform and adapted to support the shell on disassembly of the mandrel, said roller means permitting movement of the shell in the direction of the longitudinal axis thereof, means connected to the platform for engaging the shell and pivoting the same upwardly about the outer end thereof while simultaneously contracting said telescopic member toward the platform, clamping means connected to the telescopic member and adapted to engage the outer end portion of the shell and move the shell over said roller means as the shell is pivoted with the outer end of the shell being moved inwardly to a position adjacent the platform, and means for preventing longitudinal movement of the shell with respect to the longitudinal axis thereof when the shell has been pivoted upwardly to a predetermined degree to prevent the shell from slipping downwardly on said roller means when said clamping means is removed from engagement with the shell and when said shell is pivoted upwardly to a substantially vertical position.

3. A method of fabricating and erecting a storage vessel comprising, assembling a sectionalized generally cylindrical mandrel on a platform with the longitudinal axis of the mandrel being disposed substantially horizontal and with the outer end of the mandrel projecting a substantial distance beyond an end of the platform, rotating the mandrel about said axis, winding a fiber reinforcing material on the rotating mandrel in a generally helical pattern, impregnating the reinforcing material with an uncured thermosetting resin, curing the resin to form a resin-bonded fiber reinforced cylindrical shell, removing the mandrel from within the shell, tilting the shell upwardly about the outer end thereof while simultaneously moving the shell longitudinally to position the outer end of the shell adjacent said end of the platform, and lowering the tilted shell onto a preformed foundation.

4. A method of fabricating and erecting a storage vessel comprising, assembling a sectionalized generally cylindrical mandrel on a movable vehicle with the longitudinal axis of the mandrel being disposed substantially horizontal and with the outer end of the mandrel projecting a substantial distance beyond an end of the platform, mounting the mandrel for rotation on the vehicle, supporting the outer end of the mandrel for rotation, winding a resin-impregnated fiber reinforcing material on the rotating mandrel in a generally helical pattern to form a cylindrical shell, removing the mandrel from within the shell, tilting the shell upwardly about the outer end thereof while simultaneously moving the shell longitudinally to position the outer end of the shell adjacent said end of the vehicle, moving the vehicle to position the outer end of the shell above a preformed foundation, and lowering the shell onto the foundation while continuing to tilt the shell to a vertical position.

5. A method of fabricating and erecting a storage vessel comprising, assembling a sectionalized generally cylindrical mandrel on a platform with the longitudinal axis of the mandrel being disposed substantially horizontal and with the outer end of the mandrel projecting a substantial distance beyond an end of the platform, rotating the mandrel about said axis, winding a fiber reinforcing material on the rotating mandrel in a generally helical pattern, impregnating the reinforcing material with an uncured thermosetting resin, curing the resin to form a resin-bonded fiber reinforced cylindrical shell, removing the mandrel from within the shell, engaging a tilting mechanism with the inner end portion of the shell, actuating said tilting mechanism to tilt the shell upwardly about the outer end thereof to a predetermined degree while simultaneously moving the shell longitudinally on said tilting mechanism to position the outer end of the shell adjacent said end of the platform, removably securing the shell to the tilting mechanism, further actuating said tilting mechanism to tilt said shell to a substantially vertical position, and releasing the securement between the tilting mechanism to effect a lowering of the shell onto a preformed foundation.

6. A method of fabricating and erecting a storage vessel comprising, assembling a plurality of generally arcuate panels into the form of a cylindrical mandrel, rotatably supporting the mandrel on a platform on a movable vehicle, rotating the mandrel about the longitudinal axis thereof, winding a fibrous strand on the rotating mandrel in a generally helical pattern, impregnating the strand with a resinous material to form a resin-bonded fiber reinforced cylindrical shell, tilting the shell upwardly about an end thereof while moving the shell longitudinally to position said end outwardly adjacent the platform, moving the vehicle to position said end of the shell over a foundation, and lowering the shell onto the foundation with the shell disposed in a vertical position.

References Cited in the file of this patent

UNITED STATES PATENTS

| | | |
|---|---|---|
| 2,420,488 | Marhoefer et al. | May 13, 1947 |
| 2,549,810 | Hervey et al. | Apr. 24, 1951 |
| 2,568,848 | Enabnit | Sept. 25, 1951 |